(12) United States Patent
Algüera et al.

(10) Patent No.: US 8,616,575 B2
(45) Date of Patent: Dec. 31, 2013

(54) FIFTH-WHEEL COUPLING

(75) Inventors: José Manuel Algüera, Aschaffenburg (DE); Michael Elermann, Pfungstadt (DE); Swen Saupe, Mainz (DE); Achim Strütt, Riedstadt (DE)

(73) Assignee: Jost-Werke GmbH, Neulsenburg (DE)

( * ) Notice: Subject to any disclaimer, the term of this patent is extended or adjusted under 35 U.S.C. 154(b) by 581 days.

(21) Appl. No.: 12/933,262

(22) PCT Filed: Mar. 19, 2009

(86) PCT No.: PCT/EP2009/053254
§ 371 (c)(1),
(2), (4) Date: Sep. 17, 2010

(87) PCT Pub. No.: WO2009/115576
PCT Pub. Date: Sep. 24, 2009

(65) Prior Publication Data
US 2011/0025020 A1 Feb. 3, 2011

(30) Foreign Application Priority Data
Mar. 20, 2008 (DE) .................. 10 2008 000 799

(51) Int. Cl.
*B62D 53/08* (2006.01)
(52) U.S. Cl.
USPC .................. 280/504; 280/433; 280/434
(58) Field of Classification Search
USPC .................. 280/433, 434, 435, 436, 437
See application file for complete search history.

(56) References Cited

U.S. PATENT DOCUMENTS

| 3,600,006 | A | * | 8/1971 | Slaven | 280/434 |
| 3,876,239 | A | | 4/1975 | Jackson et al. | 280/432 |
| 5,472,223 | A | | 12/1995 | Hawthorne et al. | 280/437 |
| 5,876,055 | A | | 3/1999 | Fontaine | 280/437 |
| 7,140,632 | B2 | * | 11/2006 | Alguera et al. | 280/433 |
| 7,182,362 | B2 | | 2/2007 | Yeakel | 280/433 |
| 2004/0145150 | A1 | * | 7/2004 | Yeakel | 280/433 |
| 2006/0290099 | A1 | * | 12/2006 | Buttner | 280/433 |

FOREIGN PATENT DOCUMENTS

DE 4435762 A1 6/1995 ............. B62D 53/12

OTHER PUBLICATIONS

International Preliminary Report on Patentability, pp. 1-7, International Application No. PCT/EP2009/052941.

* cited by examiner

*Primary Examiner* — Tony Winner
*Assistant Examiner* — Jacob Knutson
(74) *Attorney, Agent, or Firm* — Brinks, Gilson & Lione

(57) ABSTRACT

A fifth-wheel coupling (1) having a coupling plate (2) with an entry opening (4) for a king pin (5) includes an at least single-part locking device (100) for fastening the king pin (5) and a fixing element which engages on the locking device, which fixing element can be moved from a locking position into an open position and vice versa. A securing device (15) with a blocking element (40, 400) is provided, which blocking element (40, 400) can be moved from a rest position into a blocking position and vice versa, wherein the blocking element (40, 400) projects into the entry opening (4) at least in the blocking position.

40 Claims, 14 Drawing Sheets

FIFTH-WHEEL COUPLING

BACKGROUND

The invention relates to a fifth-wheel coupling having a fifth-wheel coupling plate, on which an entry opening for a kingpin is disposed, having an at least one-part locking device for fixing the kingpin in place, and having a fixation element that engages on the locking device, which element can be moved from a locking position into an open position and vice versa.

Utility vehicles generally consist of a tractor vehicle and one or more towed trailers. In the case of such a truck and trailer combination, one speaks of a motor truck with trailer; in the case of an articulated truck and trailer combination, one speaks of a tractor unit and a semi-trailer.

Parked and non-driven vehicle parts can be secured against theft by means of mechanical devices, in each instance. The motorized parts of the truck are also generally secured against break-in and theft, for example by means of engine immobilizers or alarm systems. When the two vehicle parts are coupled with one another, a certain anti-theft protection exists for the entire articulated truck and trailer combination, by way of these systems, since uncoupling them is only possible by means of a relative movement of the two vehicle parts with regard to one another.

However, the number of thefts in which the driven vehicle is separated from the trailer or semi-trailer and the latter is subsequently stolen is constantly increasing, in spite of the current technical aids. It is therefore desirable to make available devices and systems that prevent the semi-trailer from being uncoupled in unauthorized manner, or to at least make this process so difficult that the attempt to uncouple them appears unlikely to succeed, right from the start.

From WO 03/043838 A2, an anti-theft device for fifth-wheel couplings is known, which comprises an activation device having a disabling pin. The fifth-wheel coupling has a locking hook having a securing latch that can be activated by hand, with a traction rod, by way of a linkage.

The anti-theft device provides that the disabling pin is moved either into the movement path of the securing latch or into the movement path of the components of the linkage for activating the securing latch, so that the securing latch cannot be moved from its closed position into an open position.

The anti-theft device has a receiver by way of which the activation device can be controlled. The anti-theft device is coupled with a Global Positioning System of the tractor vehicle. If the vehicle is not moving on the planned route, this is recognized by the GP system, and a signal for arming the anti-theft device is sent to the receiver, whereupon the disabling pin is brought into the disabling position.

According to another embodiment, the anti-theft device can also be controlled via the Internet, by means of an externally disposed PC, by way of the on-board computer of the tractor vehicle.

Manipulation attempts at the fifth-wheel coupling are also recognized by the anti-theft system, which thereupon automatically goes into the armed state and thus also into the locking position.

In WO 03/044627 by the same applicant, other security systems are described, where among other things, the driver's authorization is checked by way of entry of a code. In the case of non-observance of or in the case of deviation from the travel route, intervention in the vehicle functions takes place automatically.

WO 2005/028290 A1 discloses a fifth-wheel coupling having an anti-theft device, in which a disabling pin engages directly on the locking hook and fixes it in place.

By way of the traction rod, this locked state can be cancelled out. Then, separation of tractor vehicle and semi-trailer by force cannot be prevented, because the locking hook can be rotated into the open position if the tractor and semi-trailer combination is suddenly moved forward, damaging or even destroying the anti-theft device.

The anti-theft device comprises a control device in the driver's cabin of the tractor vehicle, into which a numerical code can be input for release. Furthermore, sensors and displays are connected with the control device, to monitor the fifth-wheel coupling.

DE 195 16 101 A1 describes an anti-theft device for a coupled semi-trailer. For protection of a semi-trailer coupled to a tractor vehicle, by means of uncoupling it, the fifth-wheel coupling has a lock by way of which an axially movable tappet is controlled. The tappet engages directly on the locking element of the locking hook, if the latter is in the blocking position. The placement of the anti-theft device is selected in such a manner that the tappet is at most impacted by pressure. Blocking of the manually activated locking hook has the advantage that in the case of a shock stress or overload of the manual activation, the elements of the manual activation that are smaller in cross-section will break, and in any case, the locking elements of the locking hook will remain intact. All the parts of the anti-theft device are subjected to pressure stress in the event of an unlocking attempt using force, so that relatively small cross-sections offer the required functional security.

Anti-theft devices generally engage on the locking system of the fifth-wheel coupling and are intended to disable the locking system so that it cannot be opened. The anti-theft device itself does not offer any mechanical protection that could prevent uncoupling of the semi-trailer. This is due, among other things, to the fact that the anti-theft system or the components that disable the locking system are not configured to be sufficiently stable and strong to prevent opening of the locking system by force.

It is therefore the task of the invention to equip a fifth-wheel coupling with a security device that can be used together with an anti-theft device, if applicable, and that guarantees additional security against unauthorized uncoupling of the semi-trailer.

SUMMARY

This task is accomplished with a fifth-wheel coupling characterized in that a security device having a blocking element is provided, which element can be moved from a rest position into a blocking position, and vice versa, that the blocking element projects into the entry opening at least in the blocking position, and that the blocking element is fixed in place in the blocking position when the fixation element is in the open position in unauthorized manner.

The blocking element of the additional security device forms a mechanical barrier that blocks outward movement of the kingpin even if, for example, an anti-theft device has been shut off by force and/or opening of the locking device has been carried out in unauthorized manner. An additional mechanical barrier is created with the blocking element, which barrier is configured to be so stable that is withstands forcible manipulation.

Fixation of the blocking element in its blocking position is advantageous for preventing the blocking element from being moved back into its rest position by means of unauthorized activation of the locking system; in this rest position, a potential thief might be able to expose the entry opening of the fifth-wheel coupling after all, in order to allow moving the kingpin out.

Preferably, the blocking element is disposed within the fifth-wheel coupling in covered manner, and thus is not accessible from the outside. Preferably, it cannot be activated manually.

The locking device can be a pivoting locking hook or it can consist of two or more components, which engage around the kingpin in the locked position.

Depending on the configuration of the locking device, a locking latch or a locking clamp can be provided as the fixation element that fixes the locking device in place in its locking position, and thereby blocks it.

According to a first embodiment, the fixation element is a locking latch and the blocking element interacts with the locking latch. Preferably, the blocking element contacts the locking latch and is coupled with the movement of the locking latch in the event of unauthorized activation of the locking system. If the locking latch is moved into the open position in unauthorized manner, the blocking element follows it and is moved into its blocking position.

Preferably, the blocking element is disposed to lie opposite the locking latch. In this connection, the locking latch and the blocking element are preferably disposed on a common axis. If the locking latch is disposed on one side of the entry opening, for example, the blocking element is provided on the other side. In this case, the tips of locking latch and blocking element lie opposite one another.

Preferably, the blocking element is a blocking latch. A blocking latch has the advantage that it is a stable mechanical component, which can counter unwanted removal of the kingpin with sufficient mechanical resistance.

It is advantageous if the blocking latch can be displaced in the same direction as the locking latch. When the locking latch is moved into the open position, the blocking latch is moved into the entry opening and assumes the position of the locking latch there. The movement sequence is simplified and the space requirement for the locking element, i.e. the locking latch is kept low.

The blocking latch is preferably releasably attached to the locking latch. The blocking latch is attached to the locking latch when the latter is moved in unauthorized manner. The blocking latch is pulled into the blocking position by the locking latch. The blocking latch comes free from the locking latch if the locking latch is activated in authorized manner. The blocking latch then remains in its rest position.

Preferably, the tip of the blocking latch is releasably attached to the tip of the locking latch.

In order to create this releasable attachment, it is provided, according to an embodiment, that the locking latch and/or the blocking latch has/have at least one magnet. The strength of the magnet(s) is designed in such a manner that on the one hand, the locking latch can pull the blocking latch with it, and on the other hand, the blocking latch can come free from the locking latch if the locking latch is moved in authorized manner and the blocking latch is fixed in place in its rest position.

According to another embodiment, the locking latch and the blocking element can have engagement means that engage into one another and can also be released from one another again, if necessary.

Engagement projections and engagement hooks are preferably provided as engagement means.

Another embodiment provides that the blocking element has a first spring device that presses the blocking element against the locking latch in the locking position of the locking latch. If the locking latch is retracted in unauthorized manner, the blocking latch follows it automatically and assumes the position of the locking latch in the entry opening.

The blocking element can preferably be fixed in place in its rest position. Fixation of the blocking element in the rest position is necessary so that the locking latch can come free from the blocking element in the event of authorized activation.

The means for fixation and release of the blocking element preferably comprise a first activation device having blocking means and having at least one actuator. The actuator is preferably an electrically, pneumatically, or hydraulically activated actuator.

A disabling pin or a pawl can be provided as disabling means.

Preferably, the disabling pin can be displaced perpendicular to the movement direction of the blocking element.

In order for the disabling means to be able to effectively fix the blocking element in place, preferably at least a first recess is provided, into which the disabling means can engage.

In order to be able to switch the activation device in the desired manner, it is connected with a control device. The control device can have a data entry station so that commands, numerical codes, or the like, for example, can be input. The operator can establish whether opening of the locking latch is taking place in authorized or unauthorized manner, by way of the control device.

According to a special embodiment, the control device can be connected with a monitoring device, for example a device for monitoring the locking state of the fifth-wheel coupling. Depending on the locking state, this information can be used for switching the security device.

The monitoring device can also be an anti-theft device or have such a device, in order to detect unauthorized opening of the locking hook. Such an anti-theft device can engage on the locking hook, in conventional manner, and detect unauthorized opening of the locking hook. The anti-theft device therefore preferably has a device on the locking hook, for example having a disabling pin, which is connected with a display device and/or control device in the driver's cabin. For example, this can be an anti-theft device as described in WO 2005/028290 A1.

Preferably, the blocking element is adjustable in its rest position. An adjustment can become necessary if the locking latch demonstrates wear phenomena and the contact between the locking latch and the blocking element no longer exists in the manner planned.

Preferably, a second activation device having disabling means and an actuator for fixing the locking latch in place in its locking position are provided. This second activation device can be an integral part of a separate anti-theft device, for example, or it can also be connected to the control device. This makes it possible not only to activate the security device by way of the control device, but also, as an additional measure, to disable the locking latch.

According to another embodiment, the blocking element is disposed at a distance from the locking device and the fixation element. In this connection, the blocking element does not interact with the locking latch. This embodiment has the advantage that the function of the locking mechanism is not influenced by the security device. All the functions of the locking mechanism are retained.

Preferably, the blocking element is disposed within the second half of the entry opening. This second half of the entry opening designates the last half of the entry opening in the entry direction. In this region, the entry opening has already narrowed to such an extent that a blocking element that is not overly large is already sufficient for blocking the entry opening.

Preferably, the blocking element is held in the blocking position by means of a second spring device, and can be moved to release the entry opening, counter to the force of the second spring device, by a kingpin that is moving in or out. The blocking element can be fixed in place in the blocking position.

In this embodiment, the blocking element constantly projects into the entry opening, so that the blocking position and the rest position coincide. Blocking of the entry opening is achieved in that the blocking element is also fixed in place in this blocking position, and cannot be moved by a kingpin that is moving out. In this manner, security in the event of unauthorized opening of the locking system of the kingpin is assured.

In this embodiment, as well, it is advantageous if the blocking element is a blocking latch. This blocking latch is preferably disposed so that it can move preferably perpendicular to the longitudinal axis of the entry opening.

As in the first exemplary embodiment, an activation device is provided to fix the blocking element in place and to release it, which device comprises disabling means and at least one actuator. This activation device is preferably a disabling device. This disabling device is preferably configured in such a manner that after the kingpin has moved in, the blocking element is automatically disabled in its blocking position.

The disabling device comprises a disabling piece and a third spring device that holds the disabling piece in the disabling position.

Preferably, the disabling piece has an actuator that moves the disabling piece out of the disabling position into a release position, counter to the force of the third spring device.

Preferably, the blocking element has a pawl that interacts with the disabling piece. This pawl fixes the disabling piece in place counter to the force of the third spring device. If the blocking element is moved backward by a kingpin that is moving in, counter to the force of the second spring device, the disabling piece, which is biased by way of the third spring device, is released by means of the pawl, so that the disabling piece can be pressed against the blocking element. The disabling piece is preferably moved perpendicular to the movement direction of the blocking element.

It is advantageous if the actuator is also connected with the control device, in order to be able to control the actuator in the desired manner.

Preferably, at least one of the activation devices is disposed on the fifth-wheel coupling so as to be visible from the outside. Supplementally, the activation device can have an optical and/or an acoustical device. These measures are supposed to indicate the presence of a security device to potential thieves and thus discourage them from attempting to steal the semi-trailer.

The activation device or the activation devices is/are disposed in a housing, in each instance, where the housing is screwed onto the top of the fifth-wheel coupling plate, according to one embodiment. Loosening of the screws is not possible when the semi-trailer is coupled on.

The housing can also be welded or riveted onto the fifth-wheel coupling plate. Preferably, cast iron, cast steel, high-strength light metal, or high-strength plastic is provided as the material for the housing, in order to prevent the housing from being destroyed by the effects of force.

In particular, coils, cylinders, servo motors, or hydraulic drives are suitable as actuators.

BRIEF DESCRIPTION OF THE DRAWINGS

Exemplary embodiments of the invention will be explained in greater detail in the following, using the drawings. These show:

FIGS. 3 to 9 enlarged details of the bottom view of the fifth-wheel coupling shown in FIG. 2, to explain different positions of locking latch and blocking element, as well as to explain different embodiments, FIG. 10 a schematic representation of the bottom view of a fifth-wheel coupling according to another embodiment, FIGS. 11 to 14 enlarged representations of the security device in four different positions.

DESCRIPTION OF PREFERRED EMBODIMENTS

Figure 1:
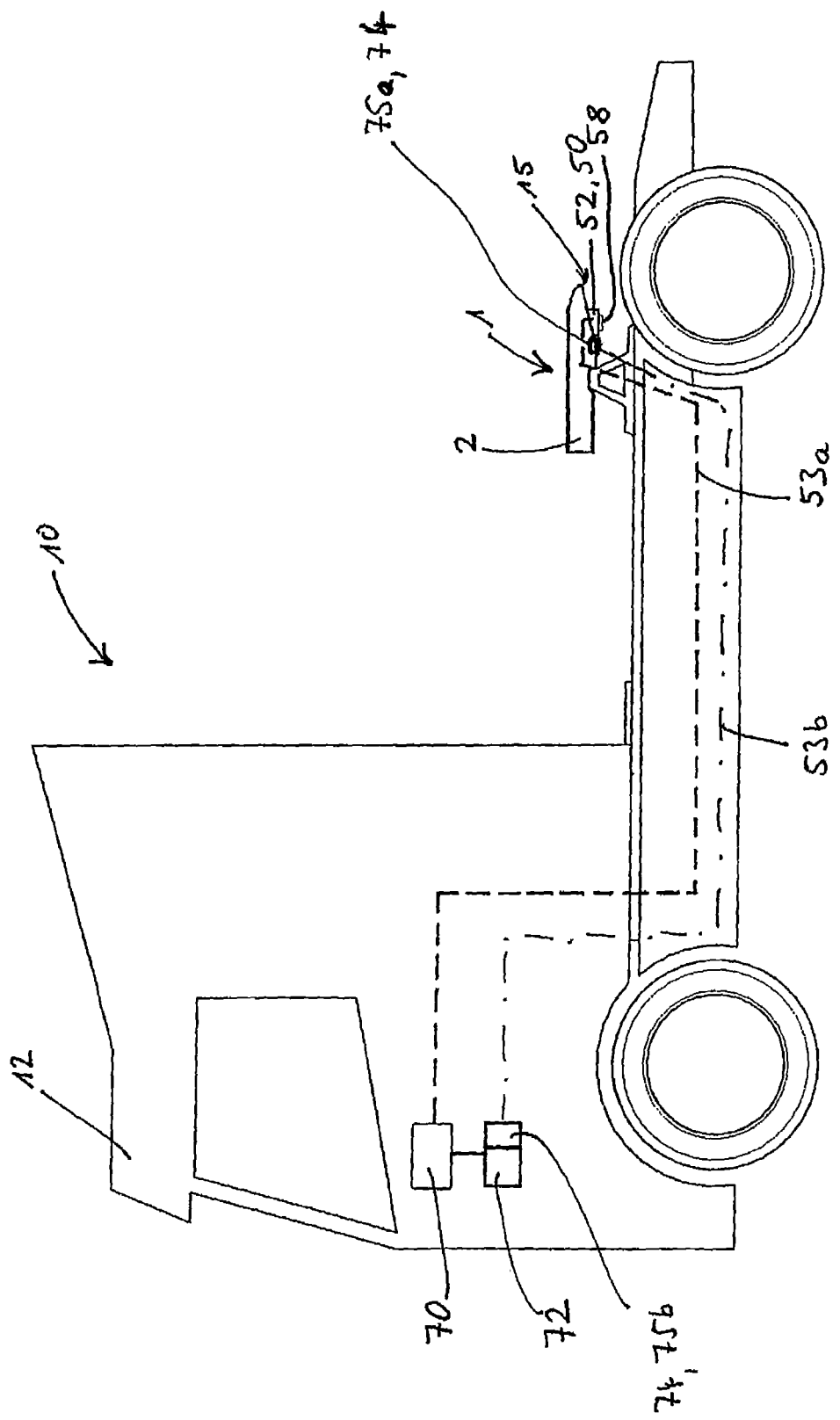
FIG. 1 a schematic representation of a tractor vehicle.

In FIG. 1, a tractor vehicle 10 is shown, which carries a fifth-wheel coupling 1. The fifth-wheel coupling 1 is equipped with an additional security device, of which only a first activation device 50 is shown in FIG. 1, which device is connected with a control device 70 in the driver's cabin 12 by way of an electrical line 53*a*.

The activation device 50 is affixed on the underside of the fifth-wheel coupling plate 2 in such a manner that it can be seen from the outside. The additional optical device 58 can blink, for example, in order to signal that the security device 15 is active. By means of these measures, potential thieves are supposed to be deterred right from the start from attempting to uncouple the semi-trailer (not shown here) from the tractor vehicle 10.

The security device 15 can be turned on and off by way of the control device 70. A corresponding data entry device, for example a code entry device, can be integrated for this purpose.

The control device 70 can also be connected with a monitoring device 72, which is connected with the locking system of the fifth-wheel coupling by way of an electrical line 53*b* (see dot-dash line) and determines the locking state of the fifth-wheel coupling. This can be an anti-theft device 74 having a device 75*a* on the locking hook and having a display and/or control device 75*b*, which device forms the monitoring device 72, for example, or is integrated into it. This information can be utilized to activate or deactivate the security system 15 in the corresponding manner, as provided, by way of the control device 70.

Such a monitoring device can also be an anti-theft device or have an anti-theft device, which also engages on the locking system of the fifth-wheel coupling and disables the locking system of the fifth-wheel coupling when it is armed. This information can also be utilized to activate or deactivate the security device 15.

Figure 2:
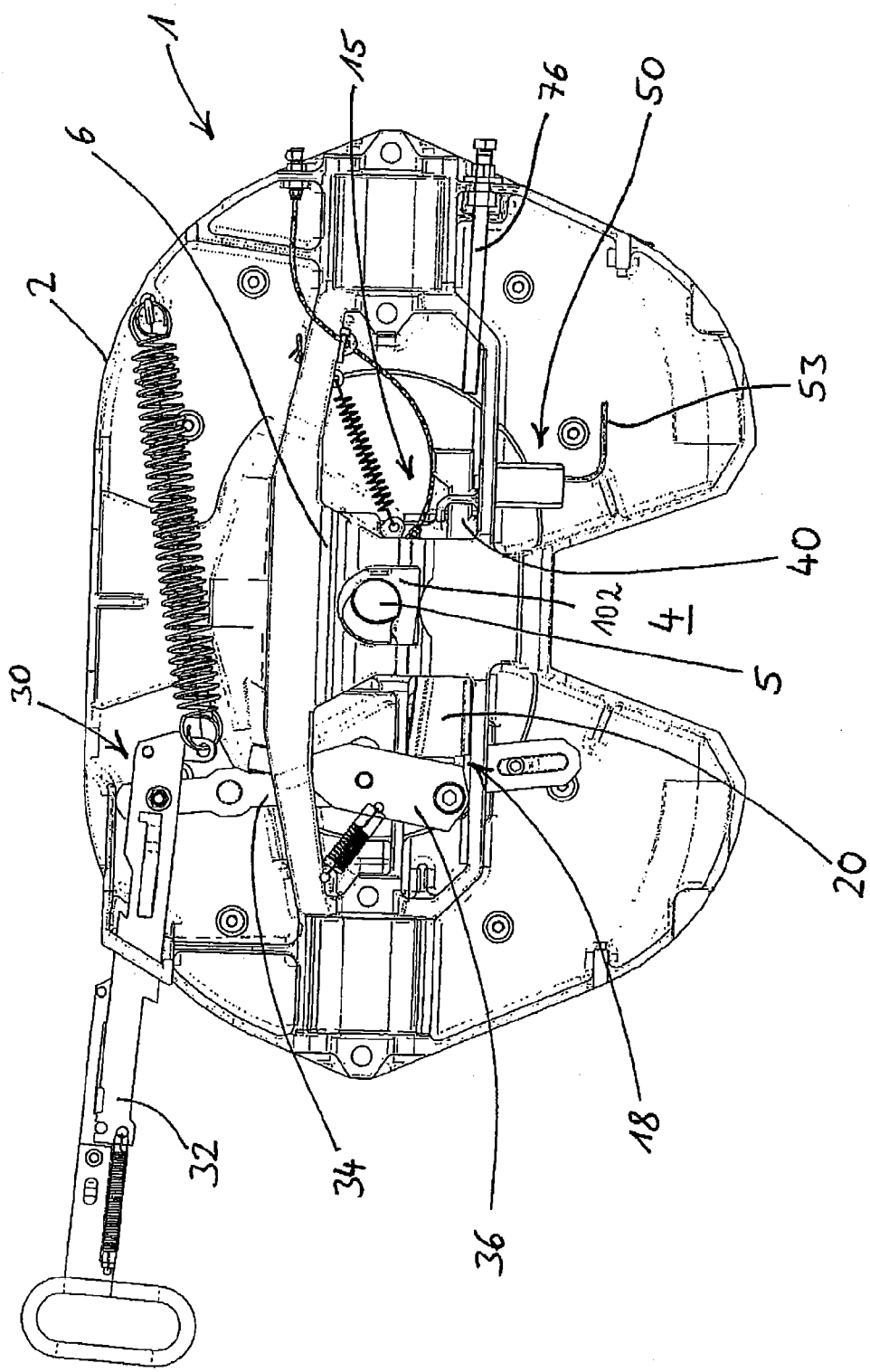
FIG. 2 the bottom view of a fifth-wheel coupling.

In FIG. 2, the bottom view of the fifth-wheel coupling 1 is shown. To move a kingpin 5 in, the fifth-wheel coupling plate 2 has an entry opening 4.

The fifth-wheel coupling 1 has a locking system 18 that comprises a locking device 100 in the form of a locking hook 102 (see also FIG. 3), a locking latch 20, and a lifting mechanism 30 having a traction rod 32 as well as having levers 34 and 36. In its locking position, the locking hook 102 engages around the kingpin 5 that has been moved in. Parts of the locking system are covered by the cover frame 6, so that the interaction of the individual components of the locking system is not evident. The position of the individual components corresponds to that in FIG. 5.

In order to move the locking latch 20 into its locking position, the traction rod 32 is displaced, with the movement being transferred to the locking latch 20 by way of levers 34 and 36.

Opposite the locking latch 20, a blocking element 40 in the form of a blocking latch and as an integral part of the security device 15 is disposed, the method of functioning of which device will be explained in detail in connection with FIGS. 3 to 9.

Behind the locking latch 40, an adjustment screw 76 is shown, with which the locking latch can be adjusted in its rest position.

Figure 3:
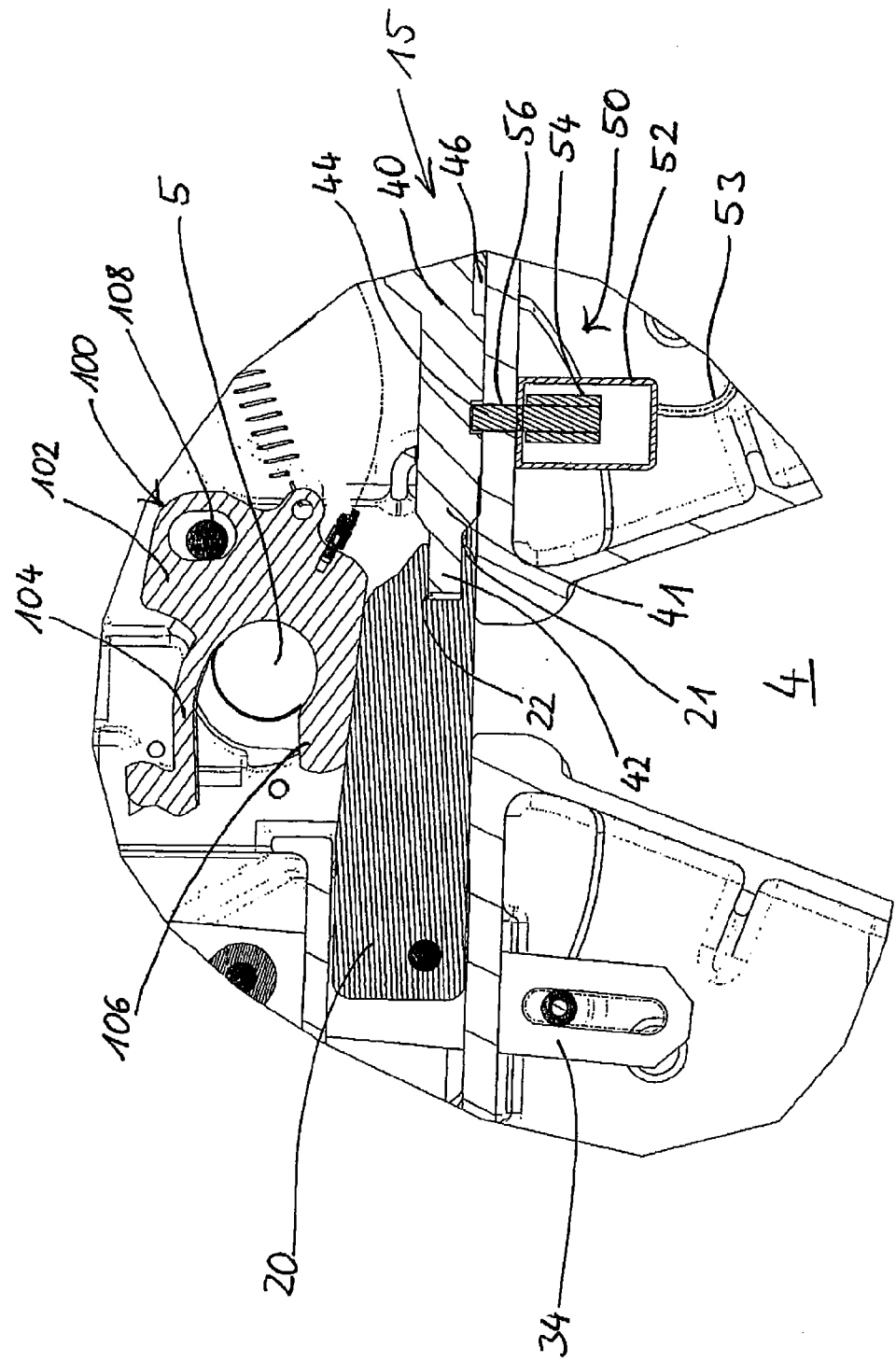

In FIG. 3, an enlarged detail view is shown, which shows the interaction of locking latch 20 and blocking latch 40.

The locking hook 102, which forms the locking device 100, can be pivoted about a stud 108 and has two shanks 104 and 106, which engage around the kingpin 5 in the locking position. In order to fix the locking hook 102 in place in its locking position, the locking latch 20 is displaced in front of the locking hook in the direction of the arrow, so that the locking latch 20 comes to lie in the entry opening 4. In this connection, the shank 106 of the locking hook 102 lies against the locking latch 20, so that the locking hook 102 is prevented from rotating out of place.

On the other side, the blocking latch 40 lies opposite the locking latch 20. In the embodiment shown here, the locking latch 20 is situated on the one side of the entry opening 4, and the blocking latch 40 is situated on the other side of the entry opening 4. At its front end 41, the locking latch 40 possesses a connecting element 42, which engages, in clamping manner, into a corresponding recess 22 on the front end 21 of the locking latch 20. A releasable connection of the blocking latch 40 with the locking latch 20 is created by way of the connecting element 42 and the first recess 22.

On one of its two longitudinal sides, the blocking latch 40 has two recesses 44 and 46. In the rest position of the blocking latch 40 shown here, a disabling pin 56 of a first activation device 50 engages into the first recess 44. This disabling pin 56 is moved by means of an actuator 54. This actuator 54 is disposed in a housing 52. The actuator is connected with the control device 70 by way of an electrical connection line 53 (see FIG. 1).

This activation device 50 is disposed in such a manner that the disabling pin 56 moves perpendicular to the movement direction of the blocking latch 40. In the rest position of the blocking latch 40, the disabling pin 56 engages into the first recess 44 and thereby disables the blocking latch 40.

Figure 4:
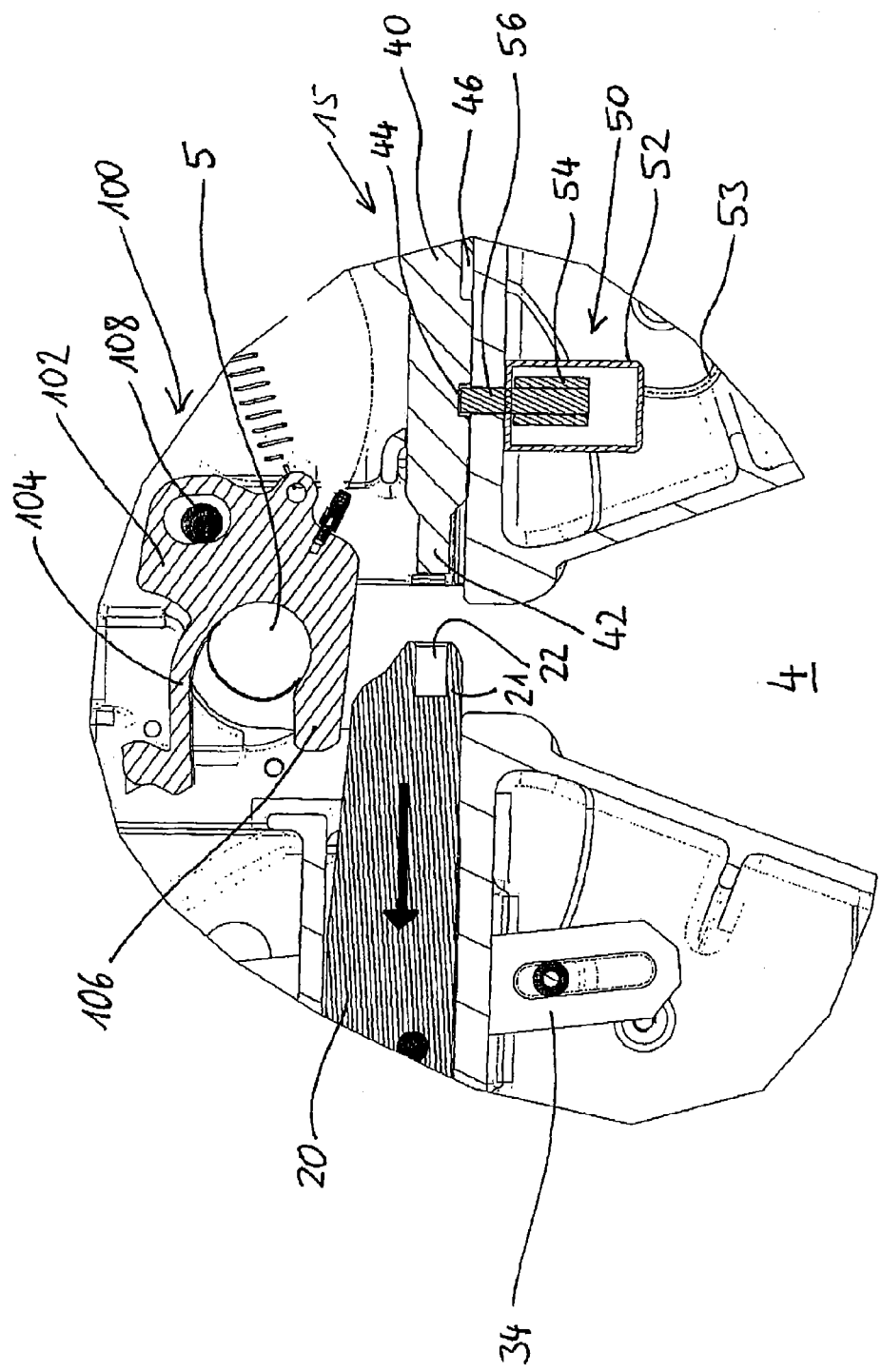

If the locking latch 20 is moved to the left, in the direction of the arrow, to open the locking hook in authorized manner, as shown in FIG. 4, the locking latch 20 comes free from the blocking latch 40 and thereby releases the entry opening 4. The locking hook can be pivoted into the open position, so that the kingpin 5 can move out.

Figure 5:
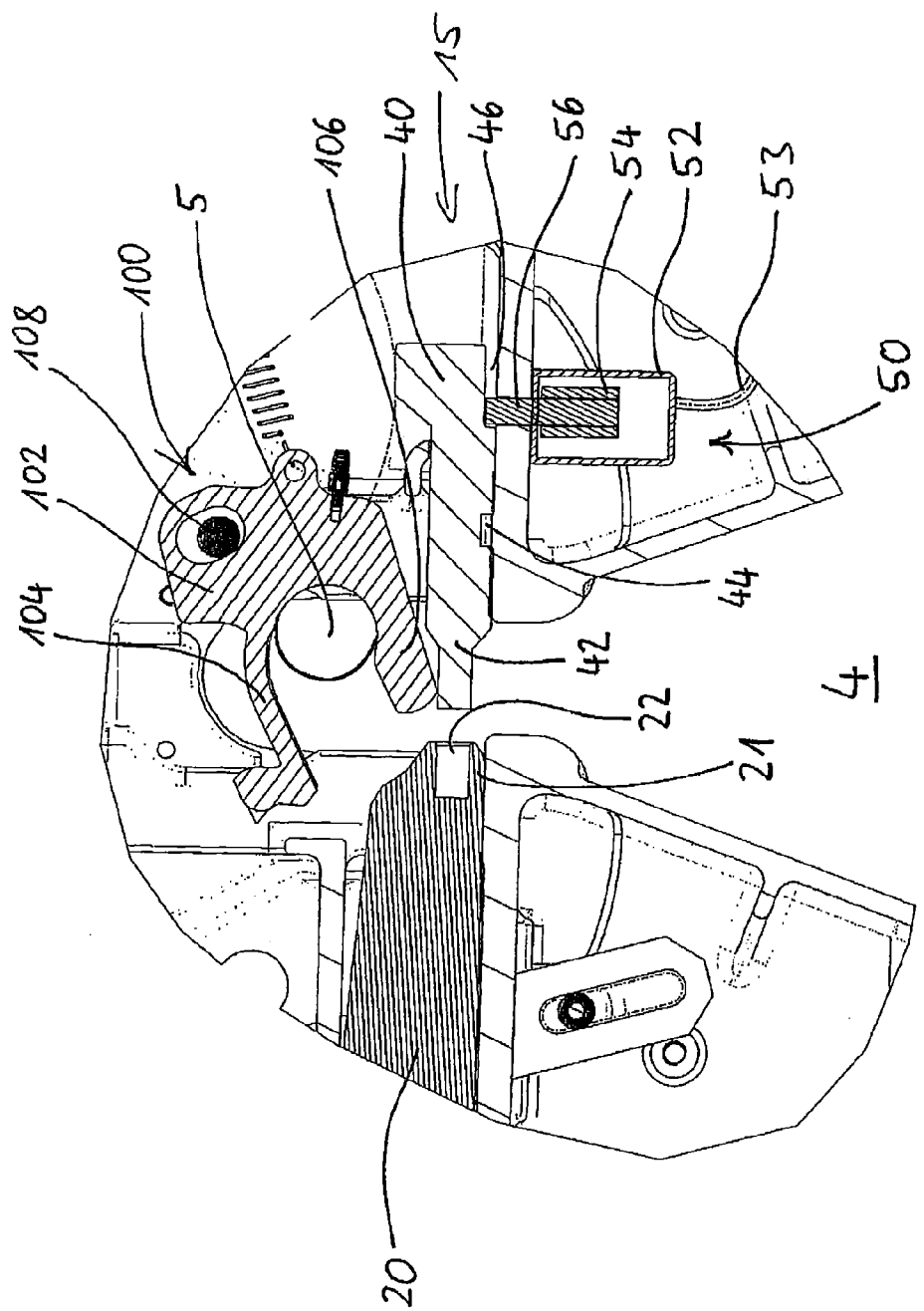

If, however, the locking latch 20 is being activated in unauthorized manner, the activation device 50 is switched in such a manner that the disabling pin 56 does not engage into the first recess 42 [sic—should be 44]. The disabling pin 56 is in a retracted position and is held in this position. The blocking latch 40 is therefore freely movable and is dragged along by the locking latch 20, so that the blocking latch 40 is pulled into the blocking position. In this blocking position, the front end with the connecting element 42 is in the entry opening 4 of the fifth-wheel coupling, as can be seen in FIG. 5. Only in this position does the locking latch 20 come free from the blocking latch 40.

In order to prevent the blocking latch 40 from being pushed back into its rest position when the locking latch 20 is pushed back, the disabling pin 56 has been moved out, so that it engages into the second recess 46. In this way, the blocking latch 40 is fixed in place in its blocking position. In this blocking position, the locking hook can only be moved within limits, where the locking hook does not release the kingpin. This ensures that in the event of unauthorized activation of the locking latch 20, uncoupling of the semi-trailer and the tractor vehicle 10 cannot take place. This is guaranteed by the blocking latch 40, which is in the blocking position.

Only by means of a release by way of the control device 70 is the disabling pin 56 retracted from the recess 46, so that the blocking latch 40 can be pushed back into its rest position according to FIG. 4.

In FIG. 6, another embodiment is shown, which comprises a second activation device 60 that has an actuator 64 having a disabling pin 66 in a housing 62. Disabling of the locking latch 20 is made possible by way of the disabling pin 66. The disabling pin 66 projects into a corresponding recess 24 of the locking latch 20, if the latter is in the locking position shown in FIG. 6. If forcible opening of the locking latch 20 were to take place, first of all the locking latch 20 is fixed in place in its position. In the event of forcible opening, the disabling pin 66 could certainly be damaged, and this is detected by way of a corresponding device. In this case, a corresponding signal is issued to the control device 70, which then retracts the disabling pin 56 so that the blocking latch 40 is released and is freely movable. This makes it possible for the blocking latch 40 to be moved into its locking position in the event of a displacement of the locking latch 20, as has been described in connection with FIGS. 3 to 5.

Figure 7:
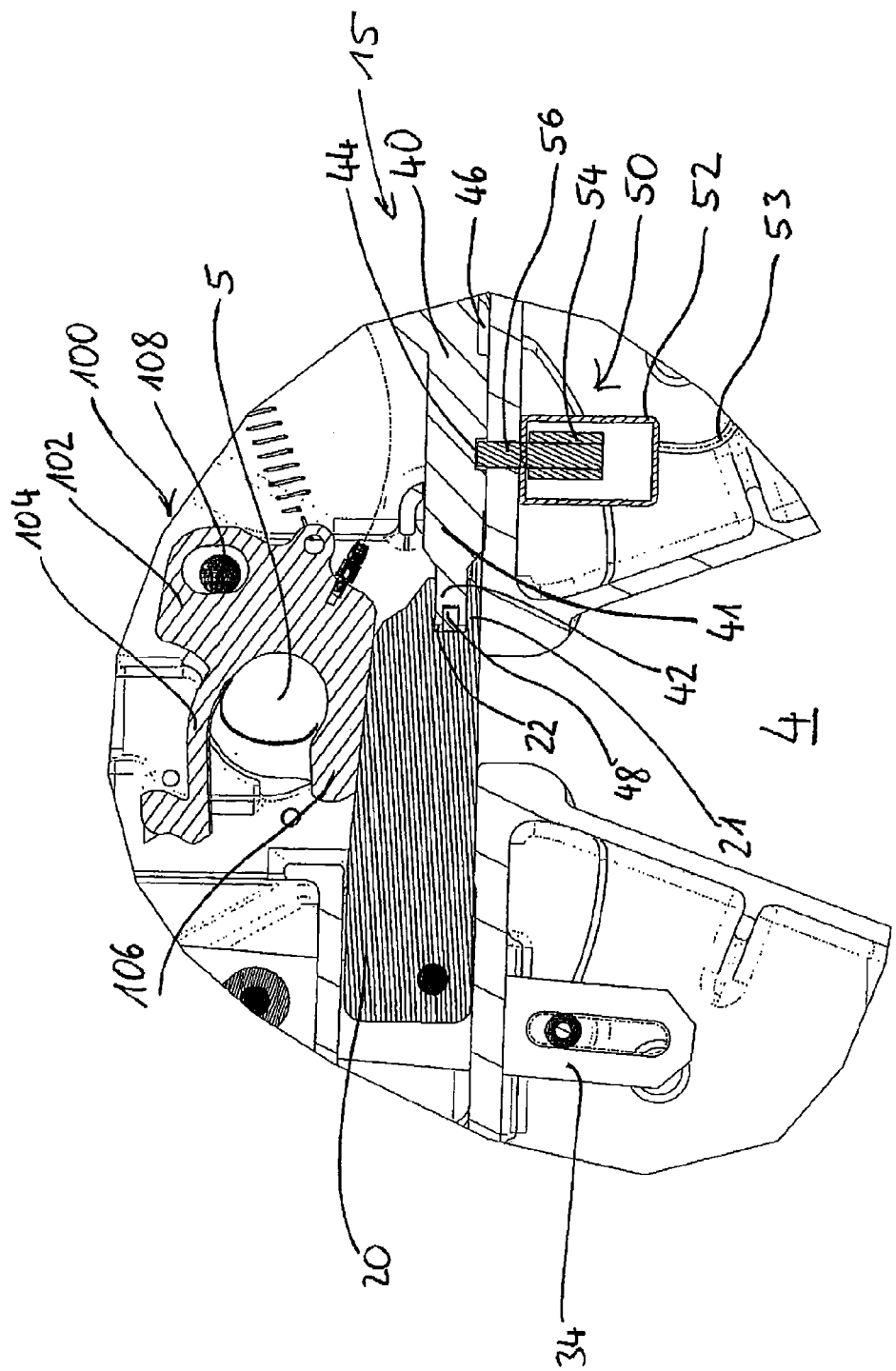

In FIG. 7, a special embodiment of the releasable connection of blocking latch 40 and locking latch 20 is shown. In the connecting element 42 of the blocking latch 40, there is a magnet 48 that projects slightly with regard to the connecting element 42, and interacts with the locking latch 20.

Figure 8:
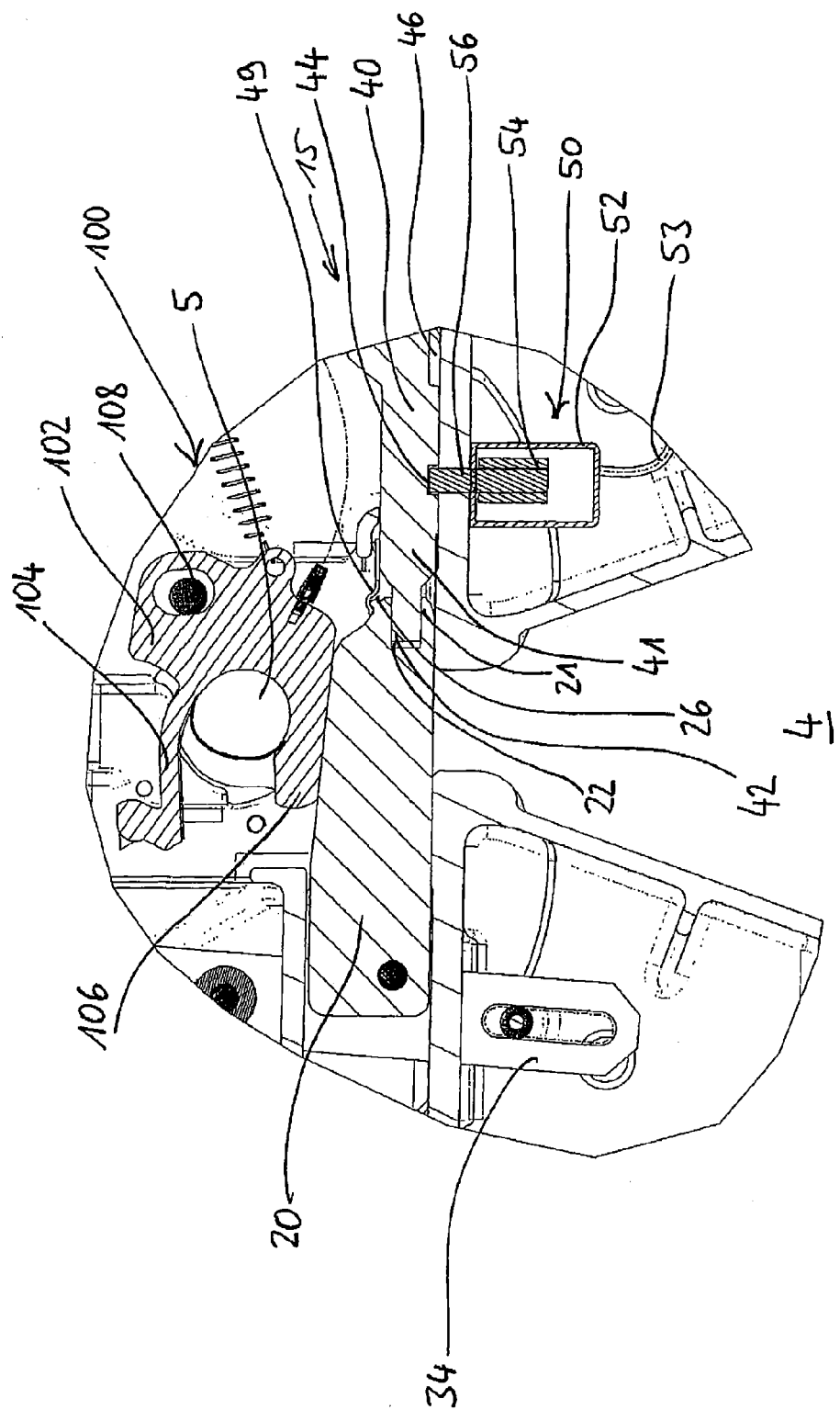
Figure 9:
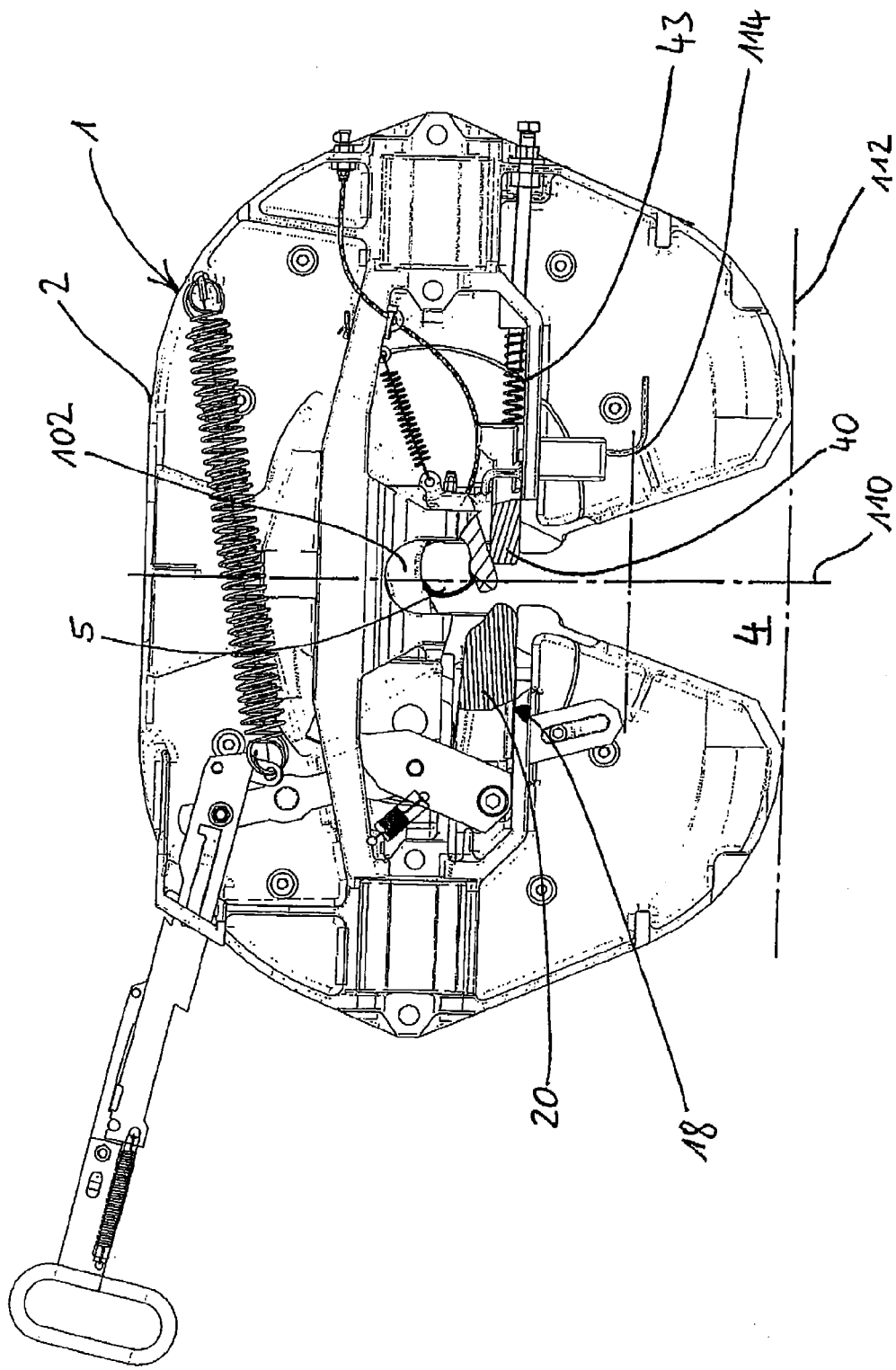

Another embodiment is shown in FIG. 8, where the locking latch 20 has an engagement projection 26 that interacts with an engagement hook of the blocking latch 40. The two engagement means are designed in such a manner that in the event of fixation of the blocking latch 40, the locking latch 20 can come free from the blocking latch 40. At the same time, the engagement means are designed in such a manner that it is possible for the locking latch 40 to be carried along if the blocking latch 40 is released and the locking latch is moved into its open position in unauthorized manner.

Figure 9:
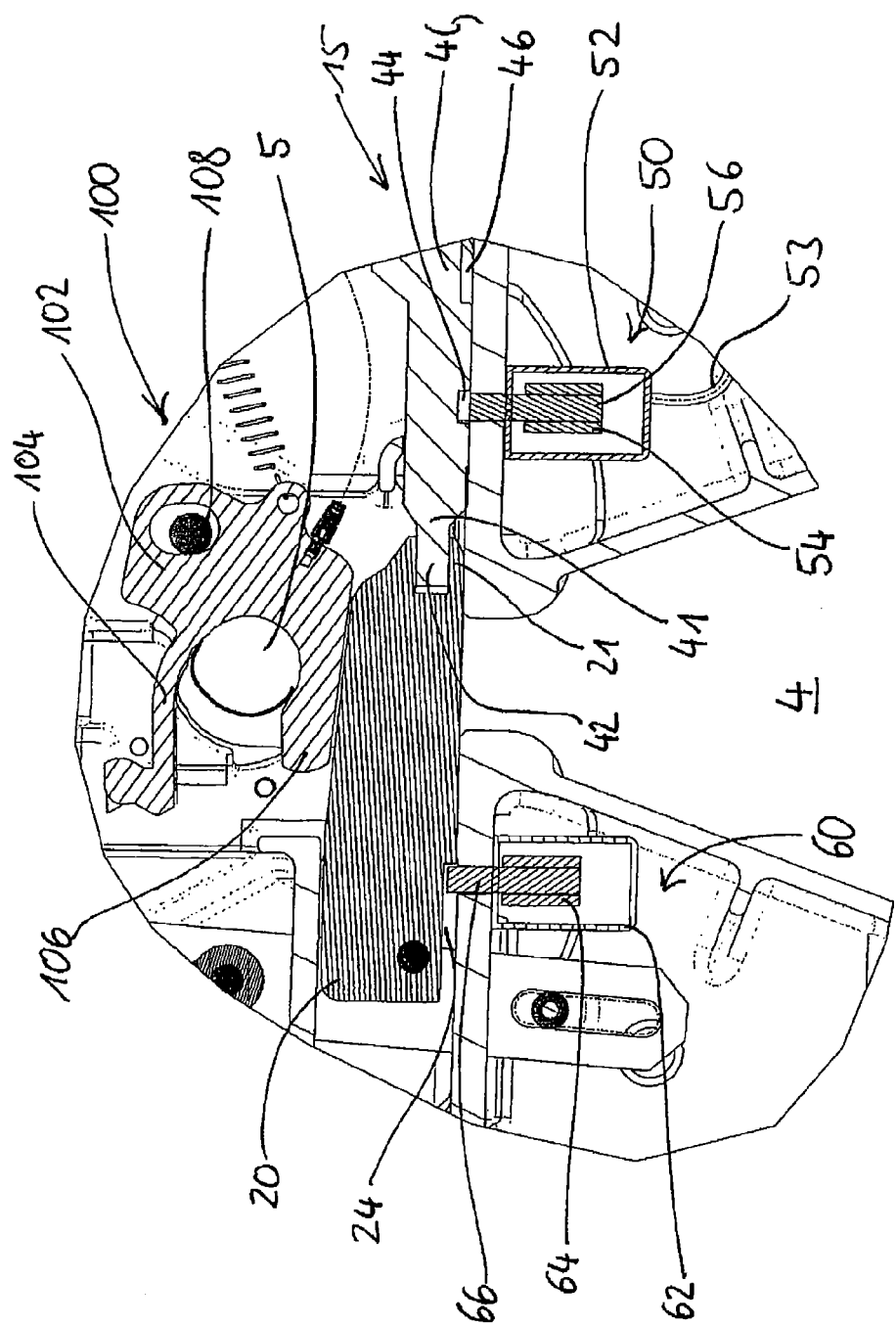

In FIG. 9, another embodiment is shown, in which the blocking latch 40 is activated by means of a spring device 43. In the position shown in FIG. 9, the locking latch 20 is in its open position, so that the locking hook 102 can move into its open position. Because of the fact that the locking latch 40 is pushed into the entry opening 4 by means of the spring device 43 that engages at its back, the locking hook 102 is disabled, so that it cannot open completely.

Figure 10:
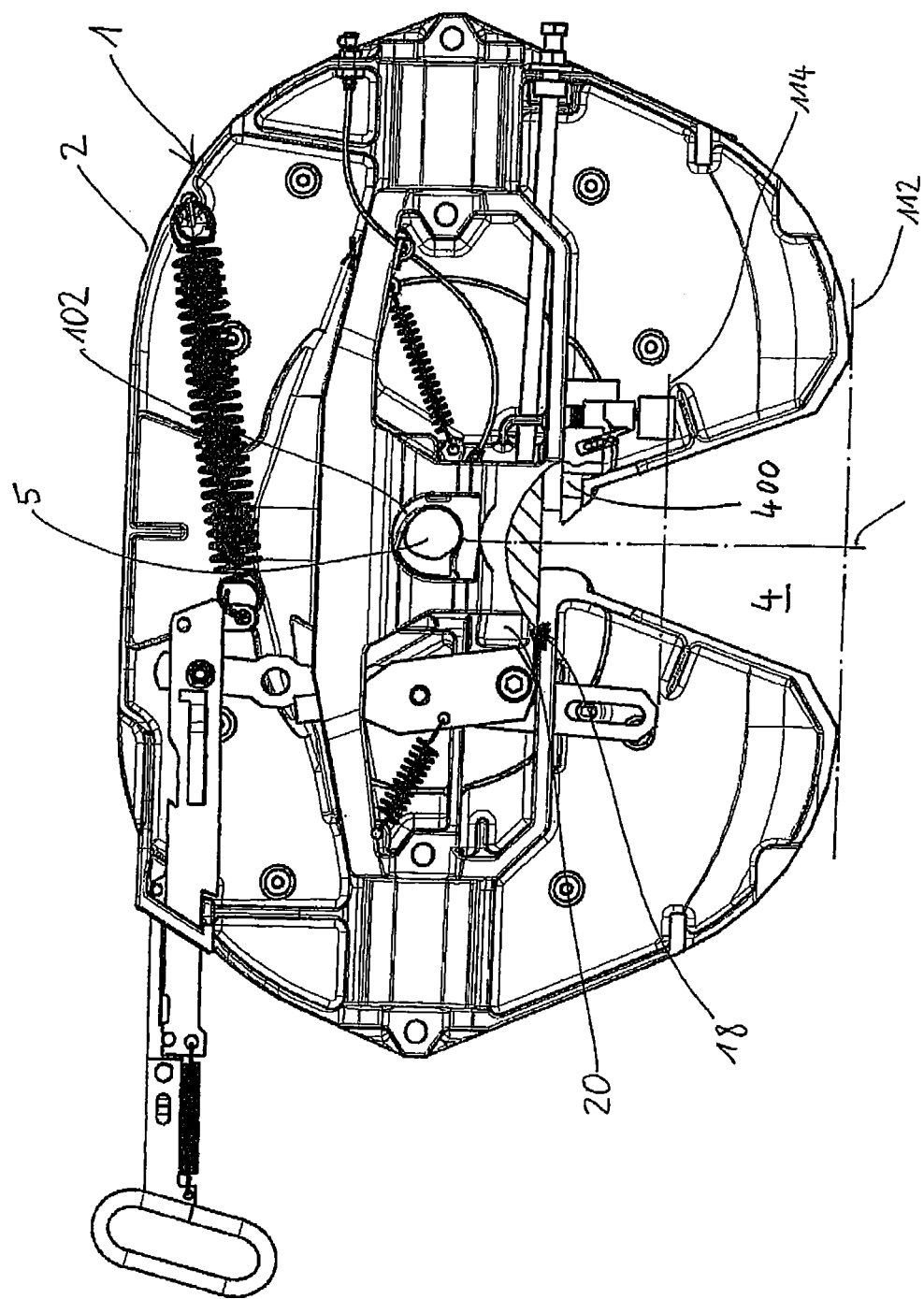

In FIG. 10, another embodiment is shown, in which a blocking latch 400 is disposed at a distance from the locking system 18 of the fifth-wheel coupling 1. The entry opening 4 extends from the outer delimitation line 112 all the way to the locking system 18, where the line 114 marks the center. The blocking latch 400 is situated in the rear half, between the center line 114 and the locking system 18, in the entry direction. The blocking latch 400 is situated to the side of the entry opening 4 and is disposed in displaceable manner, so that it can also be displaced perpendicular to the longitudinal axis 110 of the entry opening 4.

The blocking latch 400 (see FIG. 11) possesses a set-back, so that a counter-bearing surface 406 is formed, which lies against the side wall 424 of the fifth-wheel coupling plate 2.

The blocking latch 400 is guided on its longitudinal side 408 by a guide rib 420, and on the opposite side 409 by a rib 425 of the side wall 424, and is situated in a chamber 500 that has another smaller chamber 502 on the side, in which a second spring device 80 is disposed.

Figure 11:
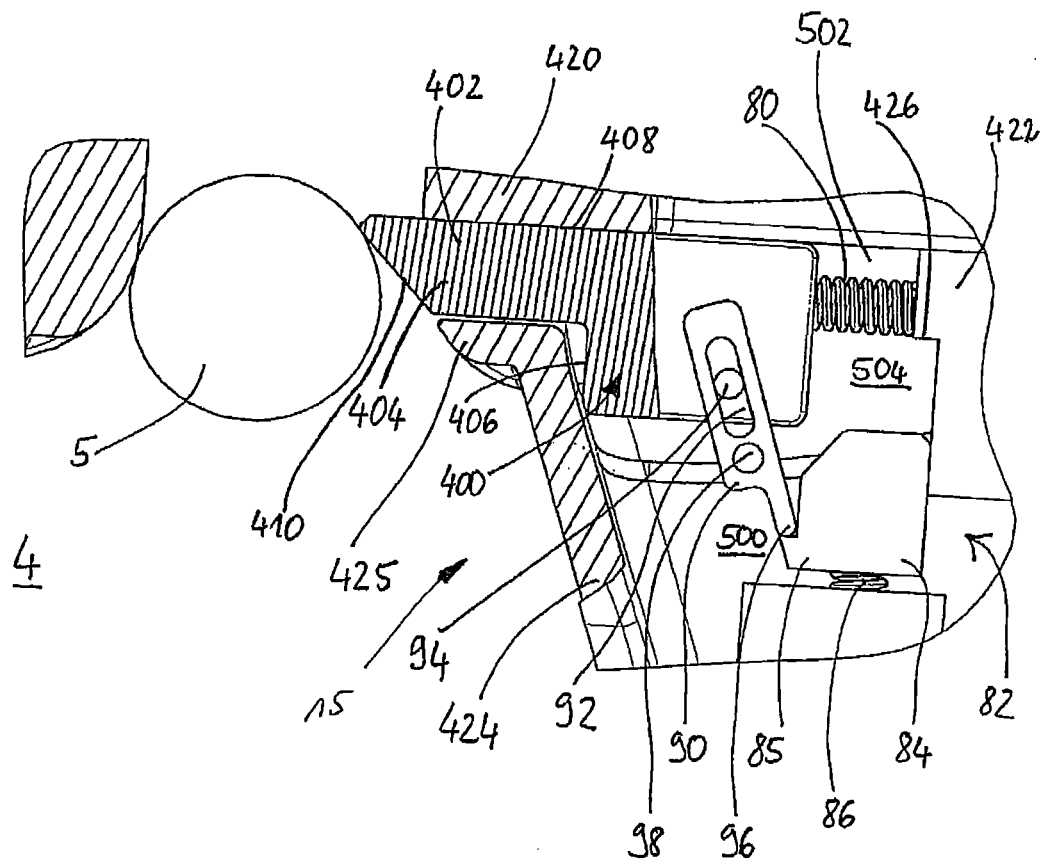

This spring device 80 supports itself on a guide rib 422 and presses the blocking latch 400 into the position shown in FIG. 11.

The blocking latch 400 furthermore has a pawl 90 that has a stud 98 at its top, which stud is mounted to rotate in the fifth-wheel coupling. The blocking latch 400 has a stud 94 that engages into an oblong hole 92 of the pawl 90, so that the pawl can be displaced in its longitudinal direction.

The front end of the pawl 90 possesses a pawl tip 96 that engages on a projection 85 of a disabling piece 84 of a disabling device 82. The disabling piece 84 is also disposed so as to be movable. The movement direction of the disabling piece 84 is perpendicular to the movement direction of the blocking latch 400.

The disabling piece 84 possesses a third spring device 86, which moves the disabling piece 84 in the direction of the blocking latch 400. The disabling piece 84 is held in its open position by means of the pawl 90, so that the blocking latch 400 is movable and can be moved counter to the force of the second spring device 80.

Figure 12:
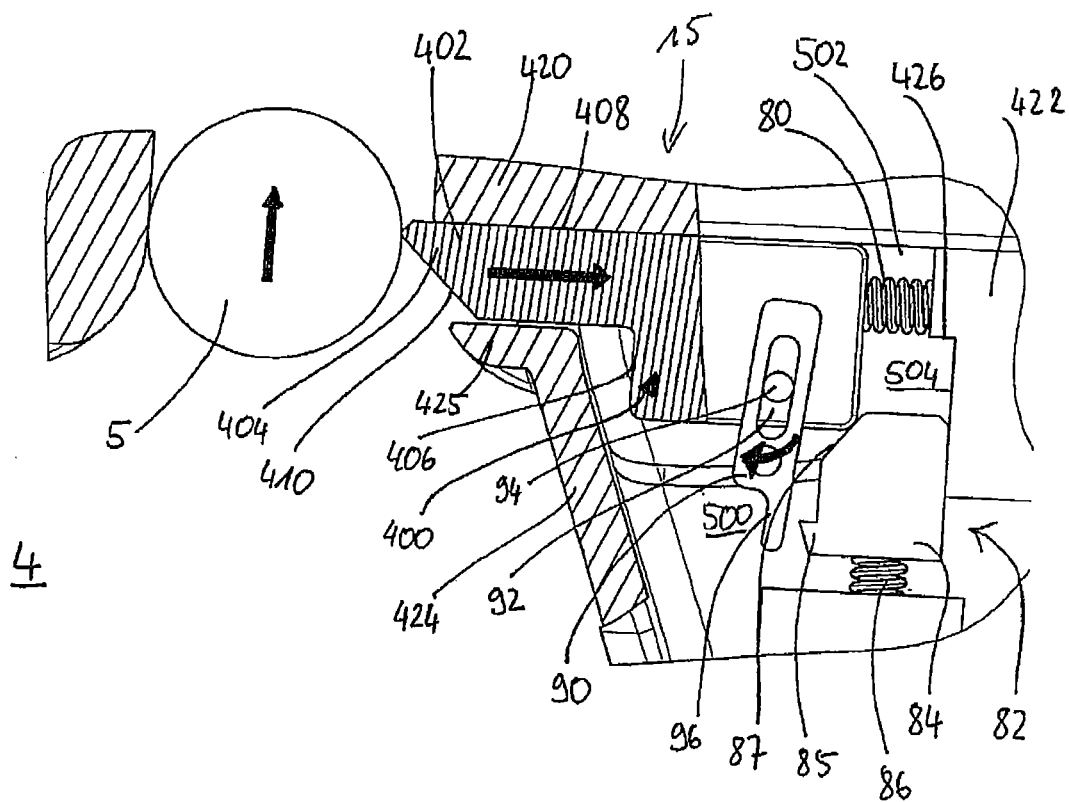

In FIG. 12, the entry process of the kingpin 5 is shown. The kingpin 5 engages on the entry slant 410 of the tip 404 of the blocking latch 400 and moves the blocking lever 400 in the direction of the arrow, i.e. into the interior of the chamber 500, counter to the force of the second spring device 80. As this happens, the pawl 90 is activated by the stud 94, and pivoted about the pin 98, so that the pawl tip 96 comes free from the projection 85 of the disabling piece 84. This has the result that the disabling piece 84 is pressed against the blocking latch 400 by way of the third spring device 86.

In the representation shown in FIG. 12, the disabling piece 84 lies against a corner of the blocking latch 400 with its slant 87. As soon as the kingpin 5 has been moved completely in, the second spring device 86 presses the blocking latch 400 into the entry opening 4, so that the blocking latch 400 assumes its blocking position. As a result, the disabling piece 84 is released from the blocking latch 400, so that the disabling piece 84 can move into the free space 504 behind the blocking latch 400, until it lies against the projection 426 of the guide rib 422.

Figure 13:
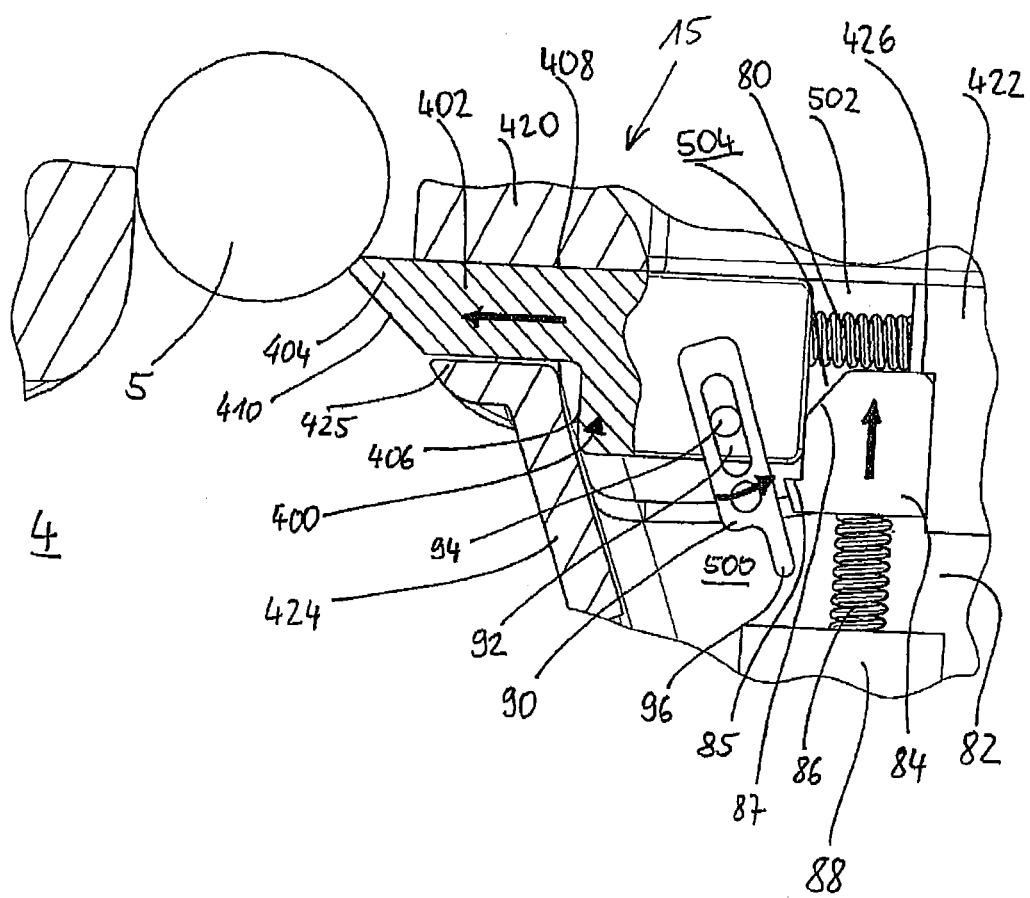

A movement of the blocking latch 400 opposite the direction of the arrow shown in FIG. 13 is no longer possible, because the disabling piece is disposed between the rib 422 and the blocking latch 400. In this way, securing is guaranteed, preventing the kingpin 5 from being moved out again.

Figure 14:
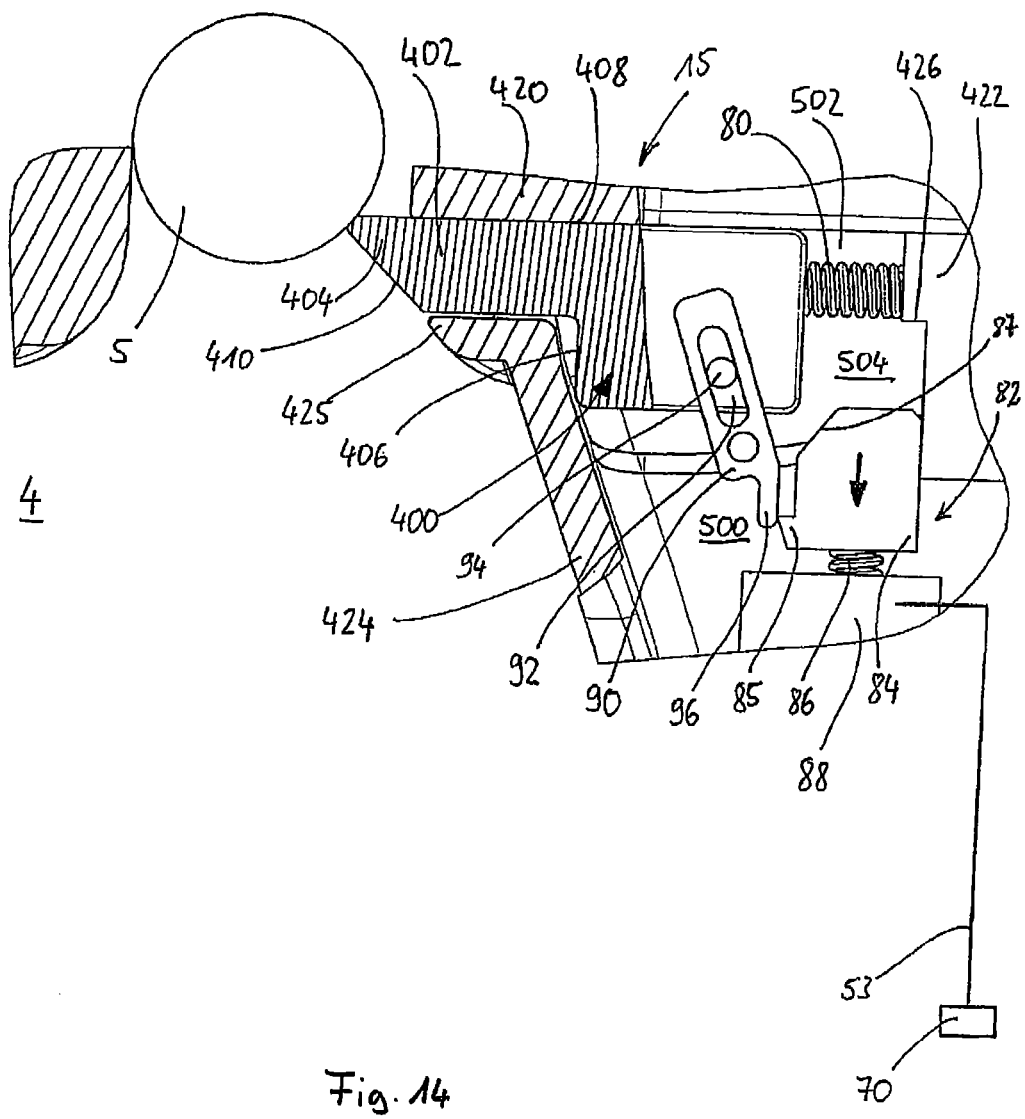

If the kingpin is supposed to be released, the disabling piece 84 is displaced in the direction of the arrow, counter to the effect of the third spring device 86, by means of an actuator 88, as shown in FIG. 14, so that the blocking latch 400 is freely movable once again. When the kingpin 5 is moved out, it moves the blocking latch 400 in the direction of the arrow, counter to the effect of the second spring device 80, where the pawl 90 is pivoted, at the same time, in such a manner that the pawl tip 96 engages into the projection 85 of the disabling piece 84 and disables it in its rest position.

REFERENCE SYMBOL LIST 1 fifth-wheel coupling
2 fifth-wheel coupling plate
4 entry opening
5 kingpin
6 cover frame
10 tractor vehicle
12 driver's cabin
15 security device
18 locking system
20 locking latch
21 front end
22 first recess
24 second recess
26 engagement projection
30 lifting mechanism
32 traction rod
34 lever
36 lever
40 blocking element
41 front end
42 connecting element
43 first spring device
44 first recess
46 second recess
48 magnet
49 engagement hook
50 first activation device
52 housing
53a line
53b line
54 actuator
56 disabling pin
58 optical and/or acoustical device
60 second activation device
62 housing
64 actuator
66 disabling pin
70 control device
72 monitoring device
74 anti-theft device
75a device on locking hook
75b display and/or control device
76 adjustment screw
80 second spring device
82 disabling device
84 disabling piece
86 third spring device
87 slant
88 actuator
90 pawl
92 oblong hole
94 stud
96 pawl tip
98 stud
100 locking device
102 locking hook
104 shank
106 shank
110 longitudinal axis
112 outer delimitation line
114 center line
400 blocking element 404 tip
406 counter-bearing surface
408 longitudinal side
409 side
410 entry slant
420 guide rib
422 guide rib
424 side wall
425 rib
426 projection
500 chamber
502 chamber
504 free space

The invention claimed is:

1. Fifth-wheel coupling (1) comprising:
a fifth-wheel coupling plate (2), on which an entry opening (4) for a kingpin (5) is disposed;
a locking device (100) for fixing the kingpin (5) in place;
a fixation element that is laterally movable from a locking position into an open position and vice versa, wherein the fixation element projects into the entry opening in the locking position and engages on the locking device (100); and
a security device (15) having a blocking element (40, 400) that is laterally movable from a rest position into a blocking position, and vice versa;
wherein the blocking element (40, 400) projects into the entry opening (4) at least in the blocking position, and the blocking element (40, 400) is fixed in place in the blocking position when the fixation element is in the open position in unauthorized manner.

2. Fifth-wheel coupling according to claim 1, characterized in that the blocking element (40, 400) is disposed within the fifth-wheel coupling in covered manner.

3. Fifth-wheel coupling (1) according to claim 1 or 2, characterized in that the fixation element is a locking latch (20) and that the blocking element (40) interacts with the locking latch (20).

4. Fifth-wheel coupling (1) according to claim 3, characterized in that the blocking element (40) is disposed to lie opposite the locking latch (20) with respect to the entry opening.

5. Fifth-wheel coupling according to claim 3, characterized in that the locking latch (20) and the blocking element (40) have engagement means.

6. Fifth-wheel coupling according to claim 5, characterized in that the engagement means comprise engagement projections (26) and engagement hooks (49).

7. Fifth-wheel coupling according to claim 3, characterized in that the blocking element (40) has a first spring device (43) that presses the blocking element (40) against the locking latch (20) in the locking position of the locking latch (20).

8. Fifth-wheel coupling according to claim 1 or 2, characterized in that the fixation element is a locking latch (20) and the blocking element (40) is a blocking latch.

9. Fifth-wheel coupling according to claim 8, characterized in that the blocking latch can be displaced in the same direction as the locking latch (20).

10. Fifth-wheel coupling according to claim 8, characterized in that the blocking latch is releasably attached to the locking latch (20).

11. Fifth-wheel coupling according to claim 10, characterized in that a tip (41) of the blocking latch (40) is releasably attached to a tip (21) of the locking latch (20).

12. Fifth-wheel coupling according to claim 10, characterized in that the locking latch (20) and/or the blocking latch has/have at least one magnet (48).

13. Fifth-wheel coupling according to claim 1 or 2, characterized in that the blocking element (40, 400) can be fixed in place in the rest position.

14. Fifth-wheel coupling according to claim 13, characterized in that means for fixation and release of the blocking element (40, 400) are provided, which comprise a first activation device (50) having disabling means and having at least one actuator (54).

15. Fifth-wheel coupling according to claim 14, characterized in that the disabling means is a disabling pin (56) or a pawl.

16. Fifth-wheel coupling according to claim 15, characterized in that the disabling pin (56) can be displaced perpendicular to the movement direction of the blocking element (40).

17. Fifth-wheel coupling according to claim 14, characterized in that the blocking element (40) has at least a first recess (44) for engagement of the disabling means.

18. Fifth-wheel coupling according to claim 14, characterized in that the first activation device (50) is connected with a control device (70).

19. Fifth-wheel coupling according to claim 18, characterized in that the activation device (50, 60) is disposed in a housing (52, 62).

20. Fifth-wheel coupling according to claim 19, characterized in that the housing (52, 62) is screwed on by way of the top of the fifth-wheel coupling plate (2).

21. Fifth-wheel coupling according to claim 19, characterized in that the housing (52, 62) is welded or riveted onto the fifth-wheel coupling plate (2).

22. Fifth-wheel coupling according to claim 19, characterized in that the housing (52, 62) consists of cast iron, cast steel, high-strength light metal, or high-strength plastic.

23. Fifth-wheel coupling according to claim 14, characterized in that the blocking element (40) is adjustable in its rest position.

24. Fifth-wheel coupling according to claim 14, characterized in that the at least one actuator (54, 64) is a coil, a cylinder, a servo motor, or a hydraulic drive.

25. Fifth-wheel coupling according to claim 1 or 2, characterized in that the blocking element (400) is disposed at a distance from the locking device (100).

26. Fifth-wheel coupling according to claim 25, characterized in that the blocking element (400) is disposed within a second half of the entry opening (4).

27. Fifth-wheel coupling according to claim 25, characterized in that the blocking element (400) is held in the blocking position by means of a second spring device (80), and can be moved to release the entry opening (4) by the kingpin (5) that is moving in or out, counter to the force of the second spring device, and that the blocking element (400) can be fixed in place in the blocking position.

28. Fifth-wheel coupling according to claim 25, characterized in that the blocking element (400) is a blocking latch that is disposed so as to move perpendicular to the longitudinal axis of the entry opening (4).

29. Fifth-wheel coupling according to claim 25, characterized in that a disabling device (82) is provided, which disables the blocking element (400) in its blocking position.

30. Fifth-wheel coupling according to claim 29, characterized in that the disabling device (82) has a disabling piece (84) and a third spring device (86) that holds the disabling piece (84) in a disabling position.

31. Fifth-wheel coupling according to claim 30, characterized in that the disabling piece (84) has an actuator (88) that moves the disabling piece (84) from the disabling position into a release position, counter to the force of the third spring device (86).

32. Fifth-wheel coupling according to claim 31, characterized in that the actuator (88) is connected with a control device (70).

33. Fifth-wheel coupling according to claim 32, characterized in that the control device (70) is connected with a monitoring device (72).

34. Fifth-wheel coupling according to claim 33, characterized in that the monitoring device (72) is an anti-theft device.

35. Fifth-wheel coupling according to claim 30, characterized in that the blocking element (400) has a pawl (90) that interacts with the disabling piece (84).

36. Fifth-wheel coupling according to claim 35, characterized in that the pawl (90) fixes the disabling piece (84) in place counter to the force of the third spring device (86).

37. Fifth-wheel coupling having a fifth-wheel coupling plate (2), on which an entry opening (4) for a kingpin (5) is disposed, having a locking device (100) for fixing the kingpin (5) in place, and having a fixation element that engages on the locking device (100), which fixation element can be moved from a locking position into an open position and vice versa, characterized in that a security device (15) having a blocking element (40, 400) is provided, which blocking element can be moved from a rest position into a blocking position, and vice versa, the blocking element (40, 400) projects into the entry opening (4) at least in the blocking position, the blocking element (40, 400) can be fixed in place in the rest position, the blocking element (40, 400) is fixed in place in the blocking position when the fixation element is in the open position in unauthorized manner, means for fixation and release of the blocking element (40, 400) are provided, which comprise a first activation device (50) having disabling means and having at least one actuator (54), and a second activation device (60) having disabling means and an actuator (64) for fixing the fixation element in place in its locking position are provided.

38. Fifth-wheel coupling according to claim 37, characterized in that the second activation device (60) is connected with a control device (70).

39. Fifth-wheel coupling according to claim 37, characterized in that at least one of the first activation device (50) or the second activation device (60) is disposed on the fifth-wheel coupling (1) so as to be visible from the outside.

40. Fifth-wheel coupling according to claim 39, characterized in that at least one of the first activation device (50) or the second activation device (60) has an optical and/or acoustical device (58).

\* \* \* \* \*